United States Patent
Wickliffe

(10) Patent No.: US 8,757,093 B1
(45) Date of Patent: Jun. 24, 2014

(54) TOWER FEEDER RACK

(71) Applicant: Emmanuel Abayomi Wickliffe, Waelder, TX (US)

(72) Inventor: Emmanuel Abayomi Wickliffe, Waelder, TX (US)

( * ) Notice: Subject to any disclaimer, the term of this patent is extended or adjusted under 35 U.S.C. 154(b) by 25 days.

(21) Appl. No.: 13/649,344

(22) Filed: Oct. 11, 2012

Related U.S. Application Data

(60) Provisional application No. 61/564,103, filed on Nov. 28, 2011.

(51) Int. Cl.
*A01K 5/00* (2006.01)

(52) U.S. Cl.
CPC .................................... *A01K 5/00* (2013.01)
USPC .......................................................... 119/58

(58) Field of Classification Search
CPC .............. A01K 5/01; A01K 5/00; A01K 1/10
USPC ..................... 119/58, 60, 61.1, 61.2, 61.3
See application file for complete search history.

(56) References Cited

U.S. PATENT DOCUMENTS

| | | | | |
|---|---|---|---|---|
| 471,848 A | * | 3/1892 | Ormsby | 135/160 |
| 1,450,143 A | * | 3/1923 | Dillman | 135/149 |
| 2,500,889 A | * | 3/1950 | Winkler | 119/58 |
| RE29,291 E | * | 7/1977 | Peak | 119/60 |
| 4,930,449 A | * | 6/1990 | Harton | 119/60 |
| 5,127,368 A | * | 7/1992 | Akins | 119/60 |
| 5,582,131 A | * | 12/1996 | Curtis | 119/51.11 |
| 5,930,971 A | * | 8/1999 | Etheridge | 52/646 |
| 6,550,421 B1 | * | 4/2003 | Sturgis | 119/57.92 |
| 2006/0070580 A1 | * | 4/2006 | Klene | 119/60 |
| 2006/0288945 A1 | * | 12/2006 | Jackson et al. | 119/60 |
| 2007/0181069 A1 | * | 8/2007 | Jack | 119/61.1 |

\* cited by examiner

*Primary Examiner* — Son T Nguyen
(74) *Attorney, Agent, or Firm* — Plager Schack LLP

(57) ABSTRACT

A tower feed rack enables a user to efficiently provide feed to animals. The tower feed rack comprises rack panels are mechanically coupled to support beams in order to provide stability to the tower feed rack. The tower feed rack is elevated from ground by rack legs mechanically coupled to the rack panels. A feed trap is located proximate the support beams in order to direct the feed from proximate the support beams to animals. In this manner, the feed can be inserted through the top of the rack panels and the feed will be directed downward into the feed trap where the feed can be consumed by animals without animal waste or material on the ground contaminating the feed.

7 Claims, 4 Drawing Sheets

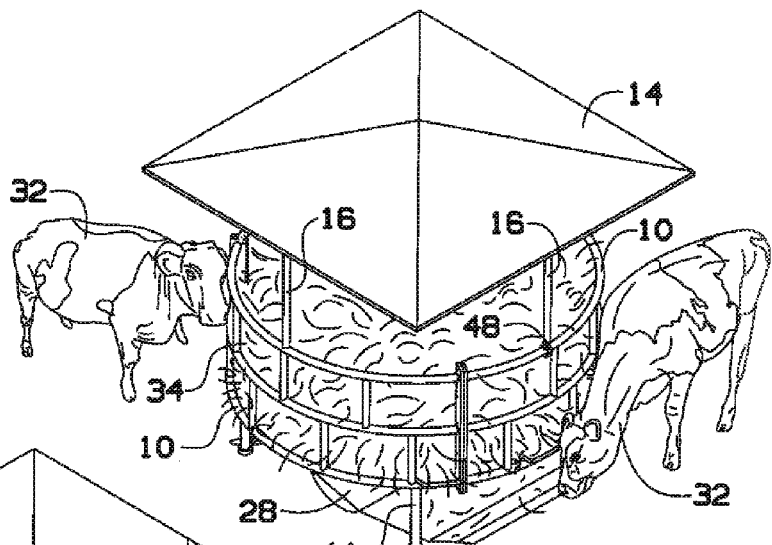
FIG.1
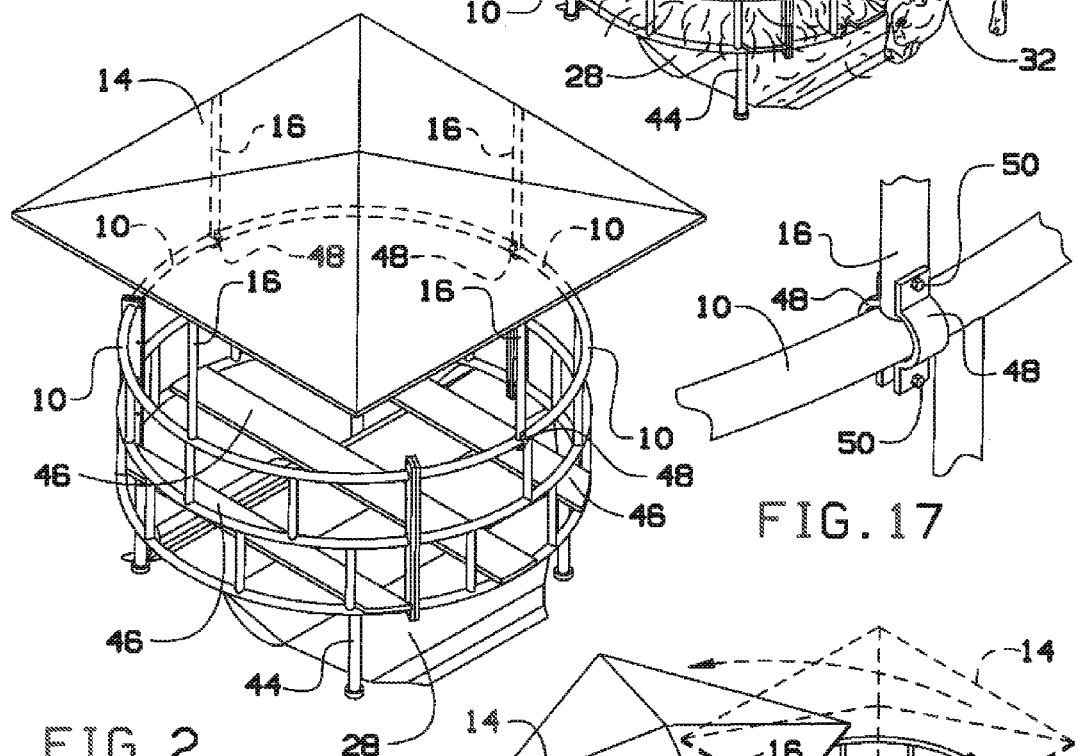
FIG.2
FIG.17
FIG.3
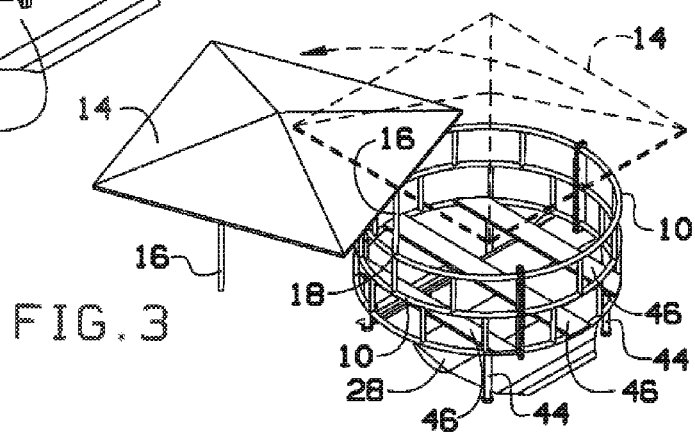

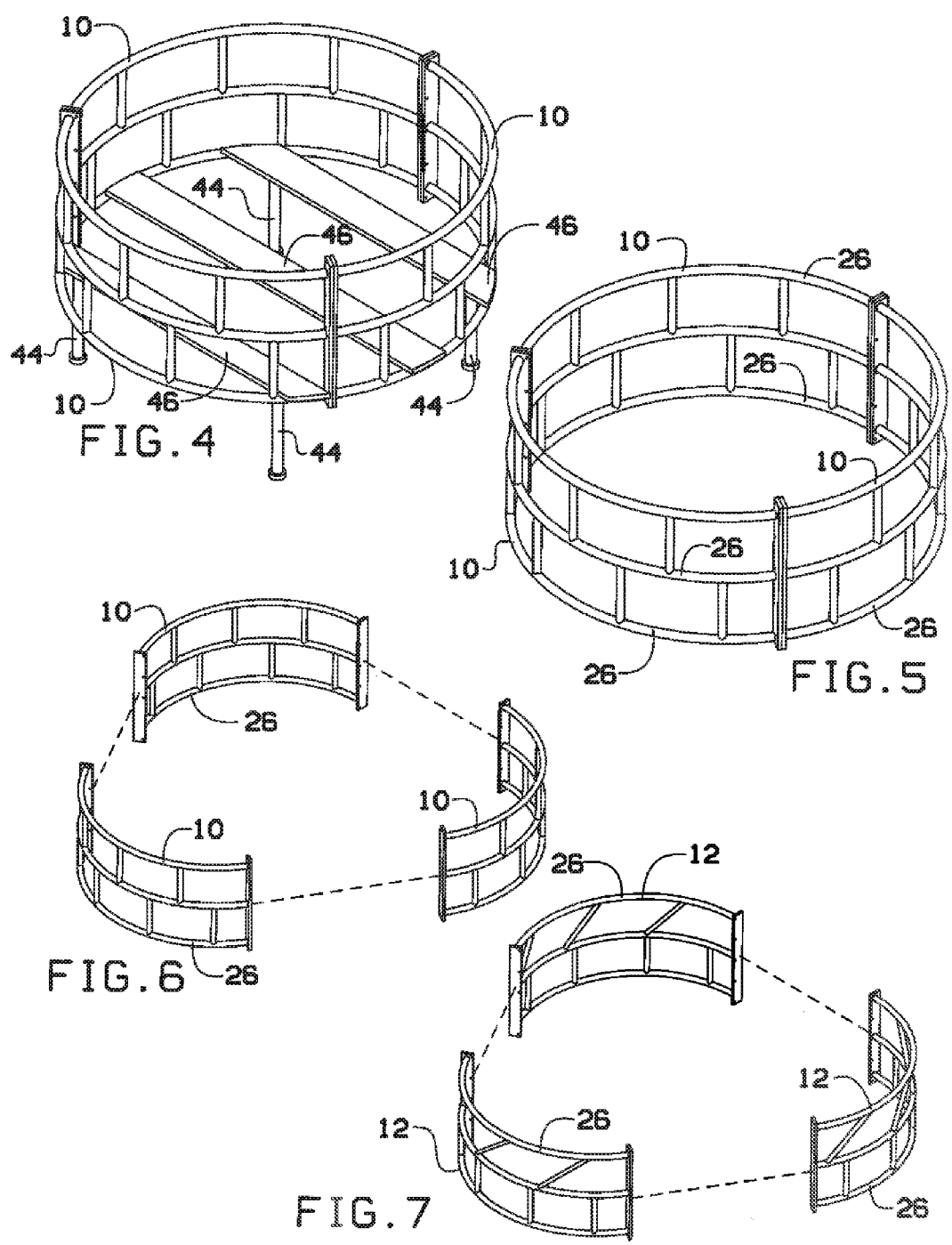

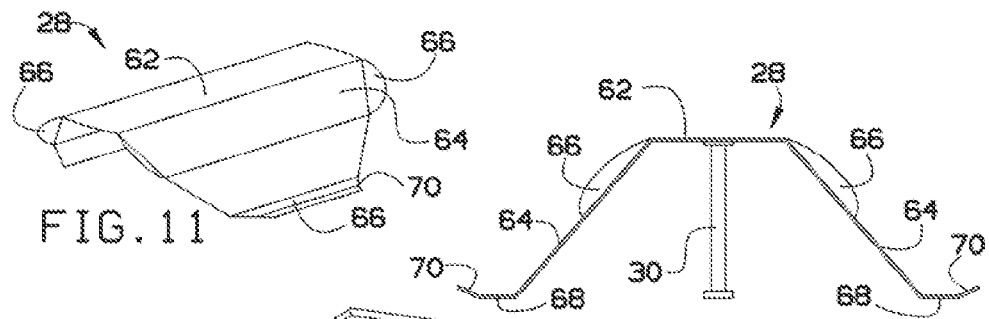
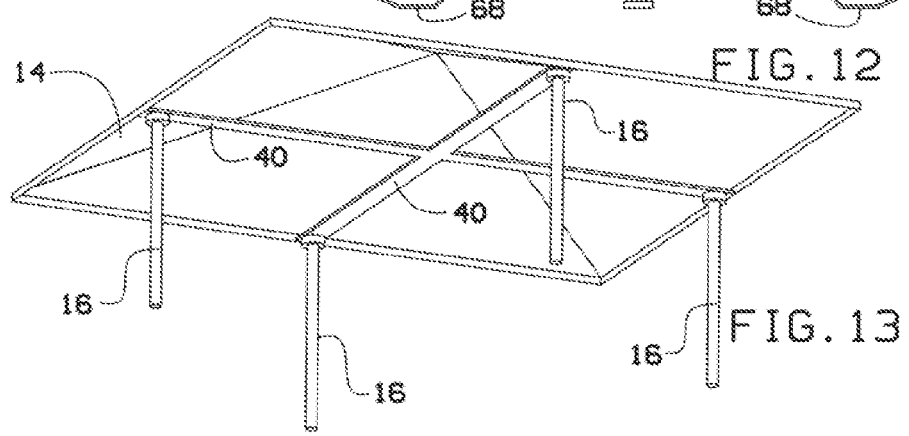
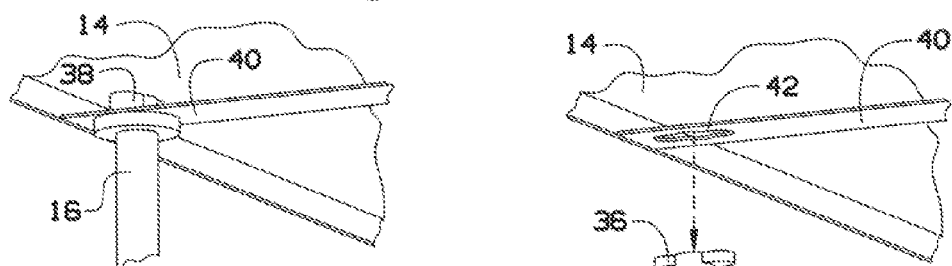
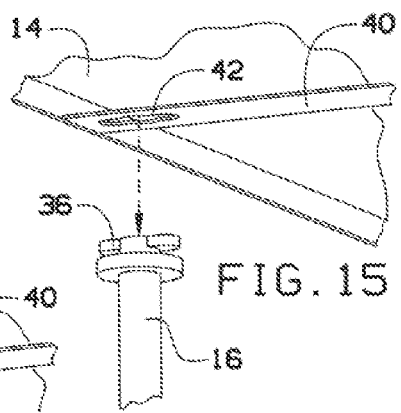
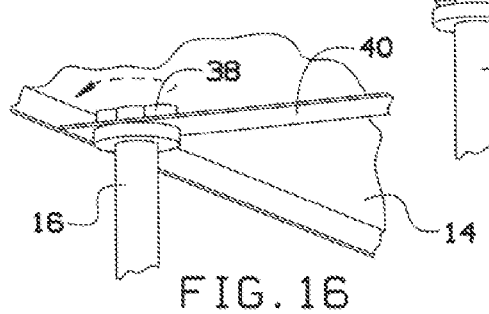

US 8,757,093 B1

TOWER FEEDER RACK

CROSS REFERENCE TO RELATED APPLICATIONS

This application claims priority to U.S. Provisional application 61/564,103 filed on Nov. 28, 2011.

FIELD OF THE INVENTION

This invention relates to devices that distribute feed to animals.

BACKGROUND OF THE INVENTION

Prior to the disclosed device, methods of distributing feed to livestock were incredibly inefficient resulting in a substantial amount of feed waste. For instance, placing feed on the ground, a technique common to the entire prior art, results in feed being wasted and soiled. The present invention teaches raising the feed up to the head of the animal which not only facilitates feeding, but also considerably reduces waste.

BRIEF SUMMARY OF THE INVENTION

A tower feed rack enables a user to efficiently provide feed to animals. The tower feed rack comprises rack panels are mechanically coupled to support beams in order to provide stability to the tower feed rack. The tower feed rack is elevated from ground by rack legs mechanically coupled to the rack panels. A feed trap is located proximate the support beams in order to direct the feed from proximate the support beams to animals. In this manner, the feed can be inserted through the top of the rack panels and the feed will be directed downward into the feed trap where the feed can be consumed by animals without animal waste or material on the ground contaminating the feed.

The rack panels are mechanically coupled to rack top removable support columns. The rack top removable support columns are further mechanically coupled to a locking extrusion. The locking extrusion can fit through locking slot in a rack top cross support bar. The rack top cross support bar is further mechanically coupled to a rack top. The user can easily couple or uncouple the rack top removable support columns from the rack panels enabling the user to easily rotate the rack top away from the support beams such that the user can both insert the feed from the top of the rack panels when the rack top is away from the support beams and the rack top can cover the feed when the rack top is proximate the support beams.

In some embodiments, the rack panels are further mechanically coupled to skirt panels such that the skirt panels further prevent the feed from through the rack panels and further channeling the feed to the feed trap.

BRIEF DESCRIPTION OF THE SEVERAL VIEWS OF THE DRAWINGS

Figure 8:
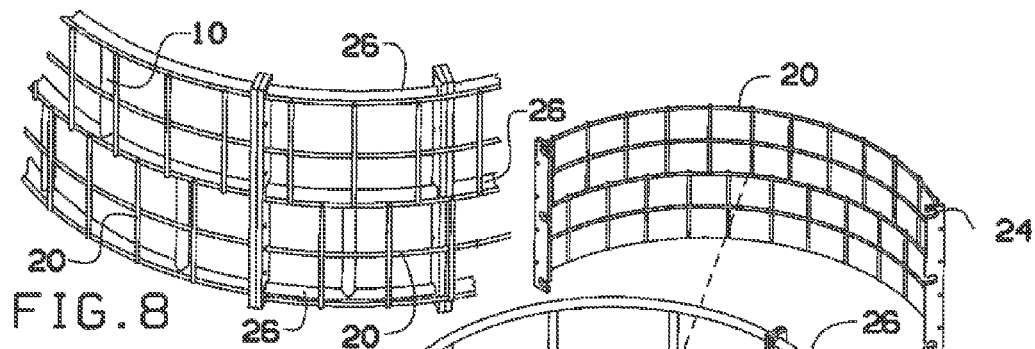
Figure 9:
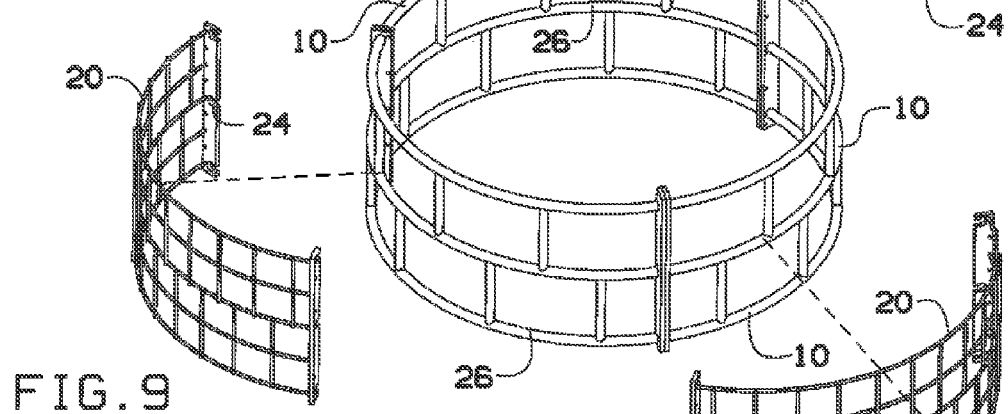
Figure 10:
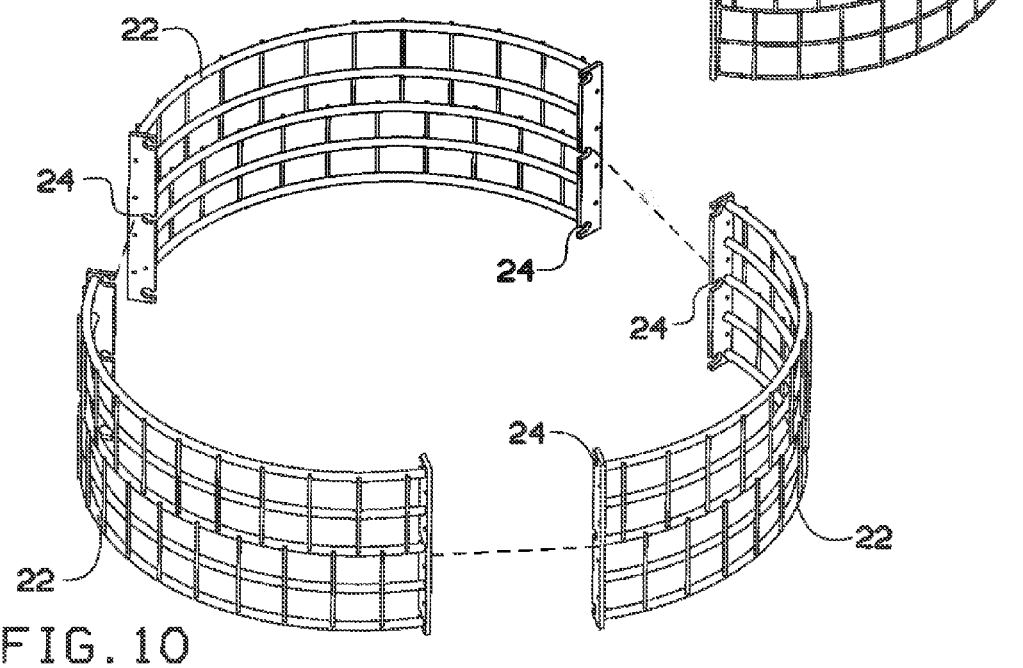

Having thus described the invention in general terms, reference will now be made to the accompanying drawings, which are not necessarily drawn to scale, and wherein:

FIG. 1 is a perspective view of the invention shown in use.
FIG. 2 is a perspective view of the invention.
FIG. 3 is a perspective view of the invention exemplifying rotational motion of the rack top.
FIG. 4 is a of the invention perspective view of the invention illustrating assembly of the non-angled rack panel with supporting elements.
FIG. 5 is a of the invention perspective view of the invention illustrating the non-angled rack panels only shown in assembled state.
FIG. 6 is an exploded view of the invention illustrating component the non-angled rack panels only.
FIG. 7 is an exploded view of the angled rack panels only.
FIG. 8 is a perspective detail view of the invention illustrating interface of the uniform diameter skirt panel and the non-angled rack panel.
FIG. 9 is an exploded view of the uniform diameter skirt panel and the non-angled rack panel.
FIG. 10 is an exploded view of the mixed-diameter skirt panels only.
FIG. 11 is a perspective view of the feed trap only.
FIG. 12 is a front view of the feed trap only.
FIG. 13 is a bottom perspective view of the rack top only.
FIG. 14 is a detail bottom perspective view of the rack top removable support column in locked configuration.
FIG. 15 is a detail bottom perspective view of the rack top removable support column in rotating configuration.
FIG. 16 is a detail bottom perspective exploded view of the invention illustrating the rack top removable support column in unlocked/removed configuration.
FIG. 17 is a detail perspective view of the invention illustrating component the clamp.

DETAILED DESCRIPTION OF THE INVENTION

Embodiments of the present invention overcome many of the obstacles associated with providing feed to animals in an efficient manner, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. A user desires to distribute feed 34 to animal 32 without wasting or contaminating feed 34. The user can accomplish this with the tower feed rack. The tower feed rack comprises three rack panels mechanically coupled to one another. The rack panels can either be non-angled rack panel 10 as shown in FIG. 4, FIG. 5 and FIG. 6 or angled rack panel 12 as shown in FIG. 7. Both non-angled rack panel 10 and angled rack panel 12 comprise rack panel support bar 26. Rack panel support bar 26 can be mechanically coupled to a skirt panel such as uniform diameter skirt panel 20 or mixed diameter skirt panel 22 as shown in FIG. 8, FIG. 9, or FIG. 10.

Rack panel support bar 26 is mechanically coupled to rack top removable support column 16 with clamp 48 as shown in FIG. 1, FIG. 2, FIG. 3 and FIG. 17. Rack top removable support column 16 is mechanically coupled to rack top 14 as shown in FIG. 13, FIG. 14, FIG. 15 and FIG. 16.

Rack panel support bar 26 can be mechanically coupled to support beam 46 and rack leg 44. Support beams 46 provide stability to the tower feed rack. Rack panel support bar 26 can be mechanically coupled to feed trap 28. Feed trap 28 is shown in more detail in FIG. 11 and FIG. 12. A plurality of rack legs 44 hold the rack panels above the ground.

One feature of the invention is that it is very easy to fill the tower feed rack with feed 34 such as hay. Rack top 14 can be rotated away from support beams 46 in order to enable a user to insert feed into the tower feed rack.

Turning to FIG. 13, FIG. 14, FIG. 15 and FIG. 16, rack top removable support columns 16 are each mechanically coupled to locking extrusion 38. Locking extrusion 38 can fit through locking slot 42 in rack top cross support bar 40. Rack top cross support bar has the shape of two perpendicular bars crossing. Each perpendicular bar bisects the other perpendicular bar and also bisects two sides of rack top 14 when rack top 14 is square.

A user can rotate locking extrusion 38 to mechanically couple in rack top cross support bar 40 to rack top removable support column 16. In this manner a user can easily couple or uncouple rack top 14 to rack top removable support column 16. While the top of to rack top removable support column 16 is mechanically coupled to locking extrusion 38, the bottom of rack top removable support column 16 is mechanically coupled to rack panel support bar 26 with clamp 48 as shown in FIG. 17.

FIG. 17 shows clamp 48 in more detail. Clamp 48 is mechanically coupled to rack top removable support column 16 with fastener 50. Likewise, fastener 50 can be removed and rack top removable support column 16 can be rotated away from support beams 46 as shown in FIG. 3. While any number of combinations of materials can accomplish this, the preferred embodiment teaches that a user should be able to easily rotate rack top 14 away from support beams 46 in order to load feed 34 into the tower feed rack.

As shown in FIG. 5, FIG. 6 and FIG. 7. The tower feed rack comprises a plurality of rack panels coupled to one another. In the preferred embodiments each rack panel has a first end and a second end. The first end and the second end each comprise panels. The panels further comprise bolt holes. A user can align the bolt holes of the first end on a first panel to the second end on a second panel and then mechanically couple the first panel to the second panel. The first end of the second panel can be mechanically coupled to the second end of a third panel and so on. The panels can be further mechanically coupled to one another by support beams 46. Again, the preferred embodiment calls for three support beams 46, but any number can be used.

Once the plurality of rack panels are mechanically coupled to one another a user can then mechanically coupled skirt panels onto the rack panels as shown in FIG. 8, FIG. 9 and FIG. 10. As shown in FIG. 1, one unique feature of the tower feed rack is that it directs feed from a central location to a side location with feed trap 28. One way to prevent feed from exiting out between the rack panels is to install skirt panels such as uniform diameter skirt panels 20 and mixed diameter skirt panels 22. Each uniform diameter skirt panel 20 is mechanically coupled to a first skirt attachment 24 and a second skirt attachment 24. Skirt attachment 24 comprises a plurality of notches that can be used to mechanically couple a first uniform diameter skirt panel 20 to a second uniform diameter skirt panel 20 and rack panel support bars 26. After affixing a skirt panel 24 to non-angled rack panel 10, a user can insert more feed 34 into the tower feed rack without having feed 34 exit from non-angled rack panel 10. This further enables feed 34 to exit the tower feed rack through feed trap 28 as shown in FIG. 11 and FIG. 12.

FIG. 11 and FIG. 12 show feed trap 28 in more detail. Feed trap 28 comprises an upper flat segment 62 mechanically coupled to two transition segments 64. The transition segments can be further mechanically coupled to guides 66 that enable feed to proceed downward and outward as in a parallel direction as opposed to out of the sides of the tower feed rack in a perpendicular direction. The transition sections 64 are each mechanically coupled to a trap section 64 that further comprises a lip 70. In this manner feed descends downward from the transition section 64 into the trap section 68 in order to efficiently provide feed to animals without risk of contamination. Feed trap 28 is supported by at least one leg 30, but more can be added depending on user preference. Feed 34 can be inserted through the top of the rack panels and feed 34 will be directed downward into feed trap 28 where feed 34 can be consumed by animals 32 without animal waste or material in the soil contaminating feed 34.

That which is claimed:

1. A tower feed rack which enables a user to efficiently provide feed to animals, the tower feed rack comprising,
    rack panels further comprising bars, mechanically coupled to support beams which are configured to provide stability to the tower feed rack; configured to encircle a central area
    rack legs, mechanically coupled to the rack panels; wherein the rack legs are configured to elevate the tower feed rack from ground;
    skirt panels, detachably coupled to the rack panels; wherein the skirt panels wrap around the entirety of the rack panels further encircling the central area; wherein the skirt panels each having horizontal and vertical bars offset from the bars in the rack panels;
    a feed trap, proximate the support beams; wherein the feed trap further comprises:
        an upper flat segment, mechanically coupled to two transition segments;
        guides, mechanically coupled to the transition segments wherein the guides are configured to direct feed proceed downward and outward from the feed trap;
        a trap section, mechanically coupled to each transition segment; wherein the trap section further comprises a lip such that feed is directed into the lip;
    wherein the feed is inserted through a top of the rack panels and the feed will be directed downward into the feed trap wherein the feed is configured to be consumed by animals without animal waste or material on the ground contaminating the feed.

2. The tower feed rack of claim 1, further comprising,
    the rack panels are mechanically coupled to rack top removable support columns; the rack top removable support columns are further mechanically coupled to a locking extrusion; the locking extrusion fits through locking slot in a rack top cross support bar; the rack top cross support bar is further mechanically coupled to a rack top;
    wherein the rack top removable support columns are configured to be coupled and uncoupled from the rack panels to rotate the rack top away from the support beams to both insert the feed from the top of the rack panels when the rack top is away from the support beams while the rack top covers the feed when the rack top is proximate the support beams.

3. The tower fed rack of claim 1, wherein
    the skirt panels further prevent the feed from through the rack panels and further channeling the feed to the feed trap.

4. The tower feed rack of claim 1, wherein
    the skirt panels are uniform diameter skirt panels such that the uniform diameter skirt panels further prevent the feed from through the rack panels and further channeling the feed to the feed trap.

5. The tower feed rack of claim 1, further comprising, the skirt panels are mixed diameter skirt panels such that the mixed diameter skirt panels further prevent the feed from through the rack panels and further channeling the feed to the feed trap.
6. The tower feed rack of claim 1, further comprising, the rack panels are non-angled rack panels.
7. The tower feed rack of claim 1, further comprising, the rack panels are angled rack panels.

* * * * *